United States Patent [19]

Daly et al.

[11] Patent Number: 4,533,988

[45] Date of Patent: Aug. 6, 1985

[54] ON-CHIP CMOS BRIDGE CIRCUIT

[75] Inventors: Christopher N. Daly, Bilgola Plateau; David K. Money, Pennant Hills, both of Australia

[73] Assignee: Telectronics Pty. Ltd., Lane Cove, Australia

[21] Appl. No.: 252,313

[22] Filed: Apr. 9, 1981

[51] Int. Cl.³ .............................. H02M 7/797
[52] U.S. Cl. .................... 363/127; 128/903; 340/825.54; 340/870.39; 455/127; 455/343
[58] Field of Search ............. 363/13, 125, 127; 332/47; 329/166; 307/261; 455/127, 73, 343, 68, 70; 340/825.54, 870.39; 128/903

[56] References Cited

U.S. PATENT DOCUMENTS 4,196,418 4/1980 Kip et al. .................. 340/825.54

OTHER PUBLICATIONS

Accaidi, "Diode-Switched FET's Rectify the Full Wave", Electronics Aug. 3, 1970.

Matino, "FET Rectifier Circuit", IBM Tech. Discl. Bul., vol. 23, No. 10, p. 4527, Mar. 1981.

Primary Examiner—William H. Beha, Jr.
Attorney, Agent, or Firm—Gottlieb, Rackman & Reisman

[57] ABSTRACT

There is disclosed a bridge circuit which finds particularly advantageous use in medical prostheses which can be programmed externally and which can transmit telemetry signals. The entire circuit is implemented on a single CMOS integrated circuit. Depending upon the values of two control bits, the bridge circuit functions to derive a powering potential from an externally transmitted signal, with or without regulation. Externally transmitted programming signals are detectable, and telemetry signals can be transmitted from the chip as well. There is no active switching of bridge devices during power rectification mode, and instead they are biased on continuously. This allows the rectifier to operate at carrier frequencies as high as several megahertz. All of this is achieved by using conventional CMOS processing techniques, without requiring any extra diffusion steps.

42 Claims, 7 Drawing Figures

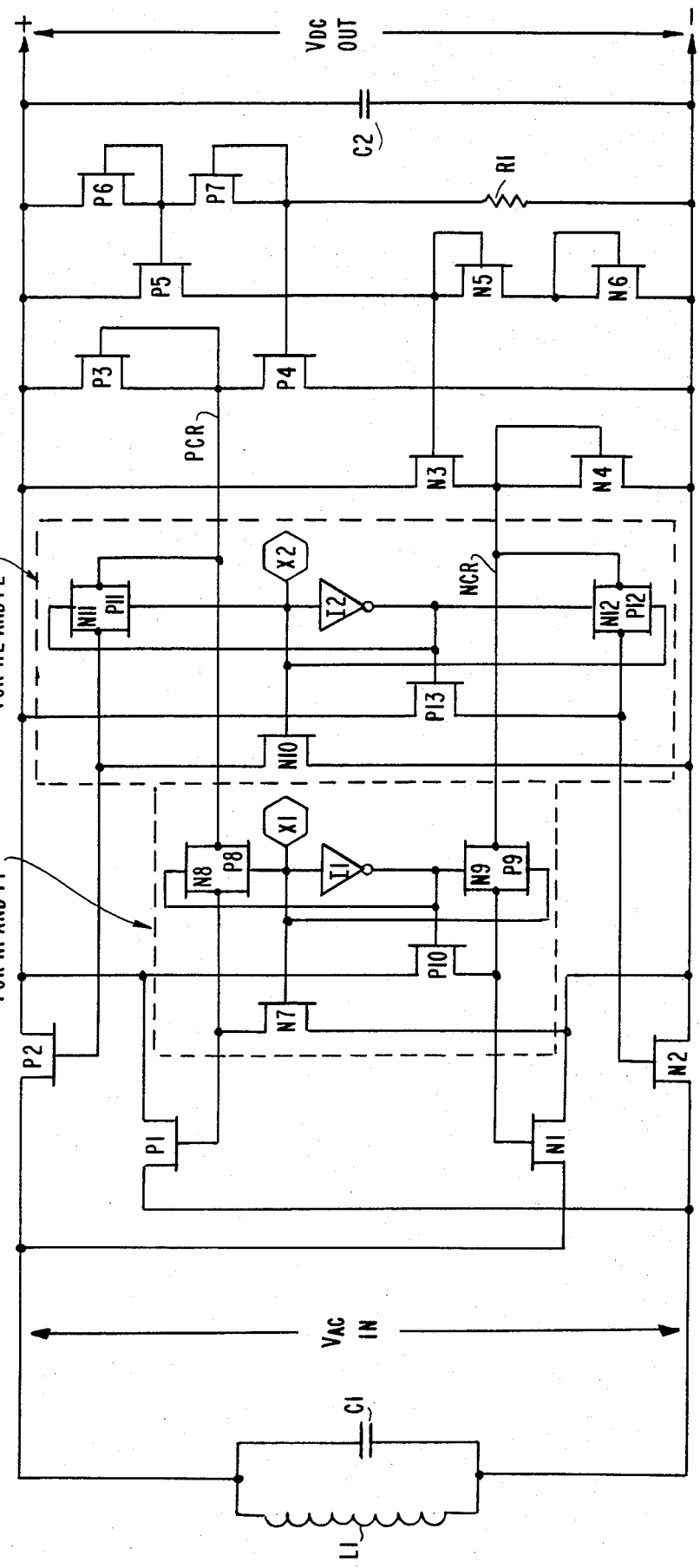

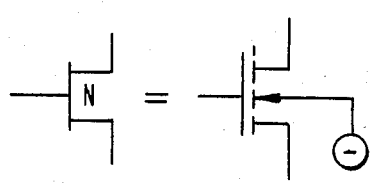
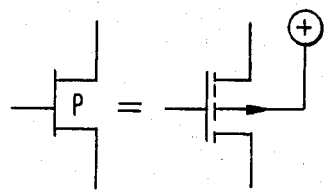
FIG. 3A  FIG. 3B
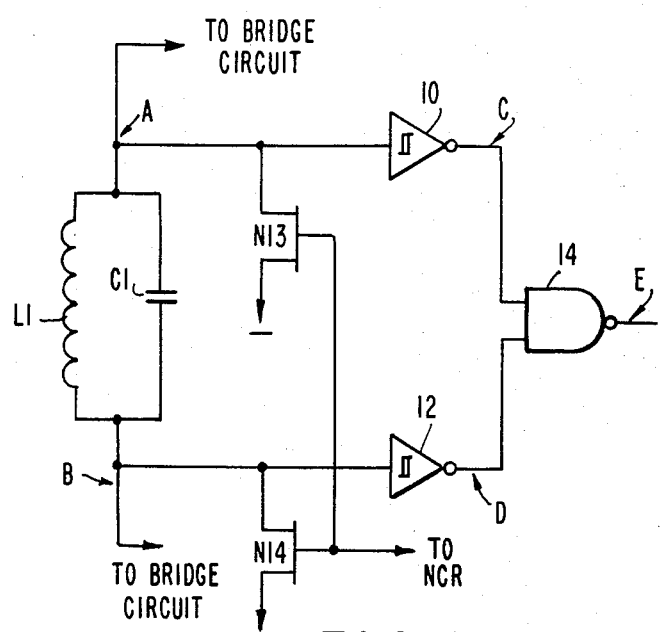
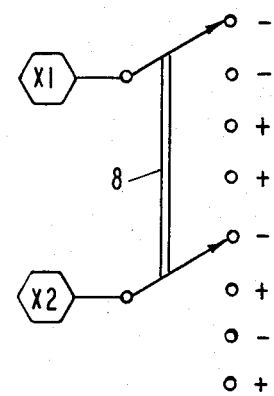
FIG. 5  FIG. 4
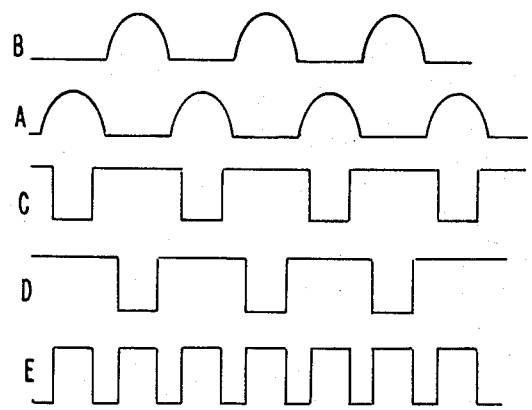
FIG. 6

ON-CHIP CMOS BRIDGE CIRCUIT

This invention relates to bridge rectifiers which both receive externally-generated power/data signals and transmit telemetry information, and more particularly to such bridge rectifiers which may be fabricated on a single integrated circuit by conventional CMOS processing techniques.

In the field of implantable electronic prostheses, there is an increasing demand for the ability to transfer power and/or data to the implanted device, and for transmitting data from the implanted device to an external monitor. An example of the need to transmit power and data to such a device is disclosed in our copending patent application Ser. No. 252,319, filed on even date herewith now U.S. Pat. No. 4,408,608, and entitled "Implantable Tissue-Stimulating Prosthesis". An example of the need to transmit data from an implanted device to an external monitor is disclosed in application Ser. No. 237,089, filed on Feb. 23, 1981, now U.S. Pat. No. 4,414,979, in the name of Hirshorn et al and entitled "Monitorable Bone Growth Stimulator".

There are a variety of techniques for achieving one-way and two-way communication, just as there are for powering an implanted device from an outside source (e.g., by inductive coupling). It is not particularly difficult to design a system for extracting power and/or data from an incoming signal. In its simplest form, a tuned coil may be connected to the input of a bridge rectifier, the output of the rectifier providing a source of DC potential for powering the overalll device. Similarly, one or two half-wave rectifiers, also coupled to the tuned coil, may be used to extract data from a pulsed input signal. The task is much more formidable, however, when other considerations are taken into account.

Many of today's implantable devices comprise CMOS integrated chips; CMOS circuits require minimal power, a feature which is very important in implantable devices. Heretofore, there has been no practical way to fabricate diode-type bridge rectifiers on CMOS or even bipolar chips using conventional processing technology, without resulting in energy wasting parasitics or requiring extra diffusion steps in order to achieve the necessary isolation between devices in the bridge. These extra steps can add considerably to the production costs of such chips. Another problem with bridge rectifiers which use active switching devices is that it takes a certain finite time for these devices to switch on and off, and this places an upper limit on the power/data carrier frequency.

It is a general object of our invention to provide a bridge circuit which lends itself to fabrication on a CMOS integrated circuit and which will function at carrier frequencies of the order of several megahertz. It is also an object of our invention to provide such an on-chip CMOS bridge circuit which can be easily controlled to operate in both receive and transmit modes.

In accordance with the principles of our invention, we provide a bridge rectifier which, in its elementary form, comprises four MOSFET devices arranged in a bridge configuration, with a tuned coil being connected across the input and the output serving to derive a source of potential for powering the overall device. (Data is extracted from the half-wave rectified waveforms which occur at each end of the coil.) In one mode of operation, the four devices function to extract power from the tuned coil, and even to regulate the resulting DC potential. In another mode of operation, the four devices are controlled to allow the DC source to pulse the coil in order to transmit data to an external monitor.

In the above-identified Hirshorn et al application, the carrier frequency is in the range of several kHz in order that Eddy-current losses in a metallic case be kept to a minimum. But especially when a metallic case is not used to enclose a device, carrier frequencies as high as several MHz may be achieved by operating the bridge rectifier in a typical fashion. The four FET devices which comprise the bridge rectifier are not switched on and off as in the prior art. Instead, all of the devices are always just on. The currents through the devices depend solely on the relative magnitudes of the potential across the tuned coil and the output voltage (as well as the control signals which determine the mode in which the system is operated). By biasing all of the devices to conduction at all times, rapid switching of currents can be achieved.

Further objects, features and advantages of our invention will become apparent upon consideration of the following detailed description in conjunction with the drawings, in which:

FIG. 1 depicts the illustrative embodiment of the invention;

FIG. 2 is a chart which depicts the mode in which the system of FIG. 1 is operated in accordance with the values of two control bits;

FIGS. 3A and 3B illustrate the symbols used in the rest of the drawing;

FIG. 4 depicts symbolically the manner in which the control bits are derived;

FIG. 5 depicts a data extraction circuit which can be used in the system of FIG. 1; and FIG. 6 depicts five waveforms which illustrate the operation of the circuit of FIG. 5.

In the drawing, the symbol "P" followed by a numeral represents a P-channel device, and the symbol "N" followed by a numeral represents an N-channel device. A P-channel or N-channel device is symmetrical in that its "source" can function as a drain and its "drain" can function as a source, depending upon how they are connected in the overall system. The effective source of a P-channel device is that terminal which is connected to the higher or more positive of the two potentials applied to the source and drain of the device, and the effective source of an N-channel device is that terminal which is connected to the more negative of the two potentials. The substrate of a P-channel device is generally connected to the most positive potential in the circuit, and the substrate of an N-channel device is generally connected to the most negative potential in the circuit.

FIGS. 3A and 3B depict the substrate connections and the two symbols which are used for the two types of devices in the system of FIG. 1. FIG. 3A depicts an N-channel device, with the substrate being connected to a negative potential. FIG. 3B depicts a P-channel device, with the substrate being connected to a positive potential. In all of the enhancement-type devices used in the system, a device is off if its gate-source potential is zero. In the case of an N-channel device, conduction is controlled by causing the gate potential to go positive relative to the source potential. In the case of a P-channel device, conduction is controlled by causing the gate potential to go negative relative to the source potential.

Referring to FIG. 1, it will be noted on the right side of the circuit that the devices at the top are P-channel and the devices at the bottom are N-channel. It is the upper terminal of each of the P-channel devices which functions as a source, and it is the lower terminal of each of the N-channel devices which functions as a source. The system also includes four transmission gates (N8, P8; N9, P9; N11, P11; and N12, P12), for extending a potential from the PCR line or the NCR line to other devices. Each transmission gate functions as an open circuit or a short circuit, depending upon the relative potentials applied to the gates of the two paired devices. Inverters I1 and I2 (made of standard devices but shown symbolically for the sake of clarity) cause opposite potentials to be applied to the two gate terminals for turning an overall transmission gate on or off.

It is the substrate connections of transistors P1, P2, N1 and N2 which play a key role in the system of FIG. 1, and these connections will be described in detail. A CMOS circuit is made on an N-type substrate. A P-channel device has two P-type regions contained in the N-type substrate, and these two regions serve as the source and drain of the device. Each P-type region and the N-type substrate behave as a junction diode. In order to prevent conduction through the diodes, the substrate is usually tied to the most positive potential in the circuit, thereby back-biasing the diodes. Thus the substrates of transistors P1 and P2 in FIG. 1, as well as the substrates of all other P-channel devices, are connected to the positive potential bus—the top side of capacitor C2, the capacitor across which a DC potential is derived for powering the overall circuit. When the right side of each of devices P1 and P2 functions as a source, a standard configuration is obtained; the substrate is connected to the source. But, as will be described below, the relative potential magnitudes change, and it is the left side of each of devices P1 and P2 which may be at a higher potential than the right side, in which case it is the left side of each device which becomes its source. In such a case, the substrate is no longer connected to the effective source of the device, but rather to its drain. This has important consequences as will be described below.

An N-channel device, on the other hand, consists of a P-type well formed in the N-type substrate, with two N-type regions—the source and drain—formed in the P-type well. The effective substrate for the N-channel device is the P-type well, the P-type material forming the anode of each of two diode junctions. In order to reverse bias the diode junctions, the P-type well is connected to the more negative potential of the source and drain. Since it is the source of an N-channel device which is connected to the more negative potential, it is the right side of each of devices N1 and N2, connected to the negative supply bus, which functions as the source when there is no potential across the tuned input circuit (L1,C1). The substrates of these devices, as well as the substrates of all other N-channel devices, are connected to the negative bus. But when a potential is developed across coil L1 such that the left side of one of devices N1 or N2 is more negative than the right side, it is the left side which functions as the effective source; in such a case, the device substrate is connected to the more positive potential of the drain. Once again, this has a significant effect on the circuit operation, as will be described.

In the system of FIG. 1, a power/data signal transmitted to the device from an external source results in an AC input signal across the tuned coil. As indicated in the chart of FIG. 2, when both of control terminals X1, X2 are low in potential, the circuit functions as a bridge rectifier and develops a DC output potential across output capacitor C2. When both control terminals are high, as will be described below, current is shunt by-passed from the tuned coil and the output capacitor. Although not shown, if the system is provided with a voltage regulator for comparing the potential across capacitor C2 with a desired potential, the two control terminals can be switched high to provide an effective shunt path across L1,C1 and C2, thus limiting the voltage to which capacitor C2 is charged. The regulating circuit itself is not shown, nor is any part of a medical prosthesis with which the system of our invention might be used. The subject invention is a bridge circuit which allows a DC voltage to be obtained, and regulated if desired. What the potential is actually used for and how the regulating circuit functions do not comprise a part of the subject invention.

Similarly, as is apparent from the chart of FIG. 2 and as will be described below, when control terminals X1 and X2 assume opposite states, a current is delivered from capacitor C2 through the coil, in one of two directions, to control the transmission of a pulse to an external monitor. What the pulse information represents and how the control signals are derived do not comprise a part of the subject invention. For that matter, it may be that no data is even to be transmitted out of the device, in which case the control terminals would not have opposite potentials applied to them.

A typical power/data format might comprise successive frames divided into 16 time slots. An incoming bit of value 0 might comprise eight cycles of an AC signal, one cycle in each of the first eight time slots of a frame. Similarly, an incoming bit of value 1 might comprise ten cycles of the AC signal, one cycle in each time slot. The eight or ten cycles would be used to charge capacitor C2 in order to derive a DC supply for the remainder of the overall device. A separate data extractor, to be described below, might be used to detect the eight or ten pulses respectively, with logic circuits being provided for distinguishing between the two cases. During the first ten time slots of each frame, control terminals X1, X2 might both be low, so that as indicated in FIG. 2 current is delivered from the tuned circuit to capacitor C2, the bridge circuit comprising devices P1, P2, N1 and N2 functioning to control a unidirectional current flow to capacitor C2, i.e., functioning as a bridge rectifier. Even should no current be required, as determined by a regulating circuit, in which case both of terminals X1 and X2 would be switched high to limit further charging of capacitor C2 by the bridge circuit, the data extractor circuit would still function to extract eight or ten pulses as the case may be.

It is during the last six time slots of each frame that data might be transmitted to an external monitor. As will be described below, by alternately switching the relative polarities of control terminals X1 and X2, current is forced to flow in opposite directions through coil L1. Switching the relative polarities twice during each time slot would result in a complete AC cycle of transmission, with the energy of capacitor C2 now being used for extending a telemetry signal to an external monitor. (Switching of the relative polarities is not required if unipolar pulses are to be transmitted.) Once again, it is to be emphasized that the circuitry for acutally controlling what takes place in the system does not comprise a part of the present invention. What is important is what happens when the relative potentials shown in FIG. 2 are applied to control terminals X1 and X2. As will become apparent, not only is the circuit relatively simple and all functions controlled by only two bit values, but the same coil can be used in both transmit and receive modes; and because the four devices that make up the bridge are not actively switched during bridge rectifier mode, carrier frequencies of several megahertz are possible.

Transistors P3-P7 and N3-N6 develop two reference voltages which are used elsewhere in the circuit to establish current flows. The PCR potential at the junction of the drain of transistor P3 and the source of transistor P4 is the P-channel reference voltage, and potential NCR at the junction of the source of transistor N3 and the drain of transistor N4 is the N-channel reference voltage. Depending upon the value of resistor R1, a current $I_o$ flow through transistors P6 and P7. (Resistor R1 may be a discrete device or an on-chip resistor, or it could even be determined by a current mirror provided elsewhere on the overall chip.) Transistors P3 and P6 have the identical configuration, and the gates of transistors P4 and P7 are connected together. This means that the same current $I_o$ flows through transistors P3 and P4, even though these two transistors do not have a resistor R1 in series with them. Because the gates of transistors P5 and P6 are connected to each other, the same current $I_o$ flows through transistor P5, and of necessity through transistors N5 and N6 as well. Finally, because transistors N4 and N6 have the identical configuration, and the gates of transistors N3 and N5 are connected together, the same current $I_o$ flows through transistors N3 and N4.

The significance of the PCR voltage is that it appears on the gate of transistor P3, and the source of the transistor is connected to the positive supply bus. Because all P-channel devices of the same geometry on the same chip are virtually identical, if the source of another P-channel device is connected to the positive supply bus and its gate is connected to the PCR potential, the same current $I_o$ will flow through it, assuming that the device is operated in the saturation region with a sufficient source-drain voltage such that the current through the device depends almost exclusively on the gate-source voltage. Similar remarks apply to the NCR potential, and any N-channel device whose gate is held at the NCR potential and whose source is connected to the negative potential bus.

With no external excitation of coil L1, and assuming that the P-channel and N-channel devices are well matched, and that each of the transmission gates comprises a short circuit (both of control terminals X1 and X2 being low in potential) for extending the PCR and NCR potentials, all of devices P1, P2, N1 and N2 have a current $I_o$ flowing through them. One such current flows from the positive bus through devices P2 and N1 to the negative bus. Another current $I_o$ flows from the positive bus through devices P1 and N2 to the negative bus. Equal currents flow through transistors P1 and P2 since both of their drains (left sides) are negative relative to their sources (right sides), they have the same gate-source voltage, and their substrates are connected to their sources. Similar remarks apply to transistors N1 and N2. (Device matching and balanced currents are not a requirement for correct operation of the circuit, although in practice the devices will be quite closely matched since this will be largely dependent upon the layout.)

Now suppose that the polarity of an incoming signal is such that the top of coil L1 (the "energy receiver") goes positive with respect to the bottom of the coil. Transistor P1 still functions as described above, with its left side still functioning as the drain; current $I_o$ (perhaps 1 microampere) still flows through it. But because the potential of the left side of transistor P2 exceeds the potential of the right side, it is the left side of the device which now functions as the source and the right side which now functions as the drain. Two effects now give rise to heavy conduction in transistor P2, from left to right.

The first effect pertains to the gate-source bias. During the quiescent state, the gate-source voltage (with the source being on the right) is equal to the difference between the positive supply potential and the PCR reference voltage. But when the left side of the device functions as the source, the gate-source potential increases substantially as the potential at the top of the coil rises well above the potential of the positive bus. This causes a substantially higher current to flow from left to right through transistor P2 than the $I_o$ current which flows from right to left through transistor P1.

The second effect has to do with the substrate of transistor P2 which is connected to the positive bus; it is now at a potential which is less than that of its source (left side). The threshold voltage of a P-channel MOSFET decreases when its source is at a potential higher than that of its substrate, or for an N-channel device when its source is at a lower potential than that of its substrate. This "back-gate" effect causes an increased current to flow in the device, for the same applied gate-source voltage.

The net effect is that transistor P2 conducts a much larger current from left to right than the $I_o$ current which flows from right to left in transistor P1. Conversely, while transistor N1 still conducts a current $I_o$ from left to right, a much larger current now flows from right to left through transistor N2, for the same two reasons. Of the four devices in the bridge rectifier, transistors N2 and P2 conduct heavily and net current flows through capacitor C2 and the coil in the clockwise direction.

Conversely, for an incoming signal of the opposite polarity, when the bottom of coil L1 is at a potential higher than that of the positive bus, transistors P1 and N1 conduct heavily, with transistors P2 and N2 conducting the quiescent $I_o$ currents. In this case, net current flows from the bottom of the coil through transistors P1 from left to right, down through capacitor C2, and through transistor N1 from right to left to the top of the coil. It is now the other half of the bridge which provides rectified current to the "energy storage" capacitor.

The bridge rectifier circuit provides a means for on-chip full-wave rectification of an AC signal. It can operate over a wide frequency range, up to several megahertz, because there is no active switching of devices to limit the speed. It is the signal itself across the coil which causes the devices to conduct in directions which charge capacitor C2. The only limiting factor on speed is the capacitances of the four devices which comprise the bridge. The capacitance of each device increases with its size. Thus there is a trade-off between maximum carrier frequency and the current which can be delivered to output capacitor C2. But operation up to several megahertz is possible for the current levels typically required in implantable devices (less than 1 ma).

In order that a device switch rapidly from conducting a low $I_o$ current in one direction to a much larger current in the opposite direction, its gate remains biased so as to permit conduction. The $I_o$ currents are not desired for their own sake; they necessarily flow and draw power from capacitor C2 when there is no potential across the coil. That is a consequence of maintaining a potential on the gate of each of the devices in the bridge which allows conduction through it at all times. But the power drain is relatively insignificant compared to the advantages which are obtained. The alternative would be to provide a mechanism to detect the polarity of the potential across the coil and to actively control which devices in the bridge conduct so as to deliver a rectified current to capacitor C2. This type of control would not only be more complex, but because devices would have to be switched on and off megahertz speeds would not be practical. Conventional MOSFET processing allows a high-speed "automatic" bridge rectifier circuit to be achieved, and the power drain is a small price to pay.

It will be appreciated that the transistors on the right side of the circuit are arranged in a configuration which is slightly more complex than might otherwise be used to derive the PCR and NCR voltages. The circuit shown is preferred, however, because the source impedances of the PCR and NCR lines are very low. Transistor P4 is arranged in a source follower configuration. By providing a source follower connected to the PCR line, a low source impedance is obtained when sourcing or sinking current. This is particularly important at high carrier frequencies where gate feedthrough capacitances of transistors P1 and P2 would cause serious modulation of the PCR line. Similar remarks apply to derivation of the NCR potential.

Thus far it has been assumed that all four transmission gates are on, so that the PCR potential is applied to the gates of transistors P1 and P2, and the NCR potential is applied to the gates of transistors N1 and N2. This is in fact the case whenever control terminals X1 and X2 are held at low potentials. A low potential at control terminal X1 is applied directly to the gate of transistor P8 and the gate of transistor P9. Because of inverter I1, a high potential is applied to the gate of transistor N8 and the gate of transistor N9. Thus all four transistors conduct as assumed above. The low potential at the gate of transistor N7 holds this device off and the high potential at the gate of transistor P10 holds this device off, so that both of these transistors can be ignored in the circuit description. Similar remarks apply to terminal X2, inverter I2 and the two transmission gates which they control, as well as transistors N10 and P13 which remain off when the system operates as a bridge rectifier. It will be noted that the devices just described are contained within phantom lines labelled "control circuits" for N1 and P1, and N2 and P2. These devices are designed to control the direction of conduction in the four transistors which comprise the bridge circuit.

Should a regulator circuit determine that capacitor C2 is sufficiently charged, the bridge circuit can be controlled to form a shunt path across the capacitor simply by causing both of the control terminals to be held at high potentials, the fourth case depicted in FIG. 2. All four transmission gates are held off, and all of transistors N7, P10, N10 and P13 are turned on. Transistors N7 and N10 extend the potential of the negative bus to the gates of transistors P1 and P2, and transistors P10 and P13 extend the potential of the positive bus to the gates of transistors N1 and N2. Thus all four transistors in the bridge circuit are turned fully on, i.e., the MOSFET channel resistances are low and probably of the order of several hundred ohms for devices intended for this application (they are not short circuits). Suppose that the top of coil L1 is positive, tending to cause a clockwise current flow through transistors P2 and N2 as described above. In normal bridge rectifier mode, transistors P1 and N1 would conduct current $I_o$ during this phase; however, in shunt regulator mode, they present a low impedance shunt path across both capacitor C2 and the tuned circuit to provide a means for controlling the voltage to which capacitor C2 is charged. Conversely, when the bottom of the coil is positive with respect to the top of the coil, conduction normally occurs through transistors P1 and N1 to charge capacitor C2, with transistors P2 and N2 conducting only current $I_o$. However, since transistors P2 and N2 are also switched on they present a low impedance shunt path across both capacitor C2 and the tuned circuit for this conduction direction. To control the shunt regulator operation, of course, a conventional voltage sensing circuit should be provided to sense the potential across capacitor C2. As described above, the manner in which the control signals applied to terminals X1 and X2 are derived does not comprise a part of the subject invention.

A current pulse of either polarity through coil L1 can be controlled by applying opposite potentials to the two control terminals. As depicted in FIG. 2, suppose that terminal X1 is held at a low potential and terminal X2 is held at a high potential. In such a case, transistors N7 and P10 are held off, and the two transmission gates controlled by terminal X1 are held on. Transistors P1 and N1 conduct (as in the quiescent state), and the current through them is determined by the PCR and NCR potentials. The capacitor discharges into the coil, with a small current $I_o$ flowing from the top of the capacitor along the positive potential bus, from right to left through transistor P1, up through the coil, and from left to right through transistor N1 and along the negative potential bus back to the capacitor. With control terminal X2 high, the two transmission gates which it controls are held off, the gate of transistor P2 is shorted through transistor N10 to the negative voltage bus, and the gate of transistor N2 is shorted through transistor P13 to the positive voltage bus. Transistors P2 and N2 are thus biased heavily on (as they are when they function as shunt regulators), and they conduct a much larger current from capacitor C2. This current flows downward through coil L1, and it is much larger than the current which flows through transistors P1 and N1 upward through the coil as a result of the NCR and PCR potential biases. The result is that it is a net downward current which flows through coil L1, and a pulse of one polarity is transmitted for detection by an external pick-up coil.

Conversely, if control terminal X1 is high in potential when terminal X2 is low in potential, transistors P1 and N1 conduct a much greater current than do transistors P2 and N2, with the resulting net current flowing upward through coil L1; the change in polarity is detectable by the external pick-up coil as a sign reversal.

The circuit of FIG. 4 is symbolic only, and depicts the manner in which the four possible voltage combinations can be controlled to appear at terminals X1 and X2. For the position of switch 8 which is shown in the drawing, both control terminals are held at low potentials. If the switch is moved downward one step, the X1 terminal will still be low in potential, but the X2 terminal will be high. If the switch is moved still further, the terminals will reverse in polarity, and in the lowest position both terminals are high. It is to be emphasized that manual control of the terminal potentials is not practical in the case of an implantable device; FIG. 4 is designed to show the four potential combinations which, in practice, would be derived by control circuits provided for this purpose.

The circuit of FIG. 1 is all that is required for full-wave rectification of an AC signal in order to derive a source of power, for regulating or limiting the output voltage of the rectifier, and for controlling pulse transmission through the coil for extending data to an external monitor. The circuit of FIG. 5 can be used to "clean up" incoming pulses so that they can be processed for data extraction purposes at the same time that they are used to charge capacitor C2 in FIG. 1. Such a circuit is useful, for example, in order to count eight or ten cycles when it is necessary to determine whether a 0 or a 1 has been received. Coil L1 and capacitor C1 in FIG. 5 are the same as those depicted in FIG. 1. The two connections indicated to the bridge circuit are the connections shown in FIG. 1. The remainder of the circuitry on FIG. 5 is for data extraction purposes.

Points A and B are connected through transistors N13 and N14 to the negative voltage bus. Both of these transistors have their gates connected to the NCR potential, so that they are both just on. The function of transistors N13 and N14 is to pull down points A and B when the coil is not being energized. Referring back to FIG. 1, it will be recalled that a current $I_o$ flows through each of transistors P1, P2, N1 and N2 during periods of non-energization. These currents tend to hold the coil, and points A and B, halfway between the potentials of the positive and negative busses. This is an indeterminate logic state. By placing the two N-channel devices in the data extractor circuit in parallel with transistors N1 and N2, the currents in the overall circuit are unbalanced and this results in points A and B being held near the potential of the negative bus, a defined logic level. The operation of the circuit of FIG. 1 is not changed, however, and the circuit still functions as described.

Instead of providing two separate transistors N13 and N14, the current unbalance may be achieved by making transistors N1 and N2 larger than transistors P1 and P2.

During alternate half cycles of a received signal, points A and B go positive alternately, following the input voltage. The two inverters 10, 12 are provided with hysteresis, as indicated, so that their outputs at points C and D exhibit clean transitions even under slow or noisy input transitions. Points C and D are connected to inputs of gate 14, whose output at point E is the data signal which is processed. An output pulse is provided at point E for each half cycle of the received input.

The five waveforms of FIG. 6 depict the signal levels at respective points A-E. Waveforms A and B are simply half-wave rectified signals. Waveforms C and D consist of square-wave pulses, each of whose widths is slightly narrower than the width of a respective one of the half-wave inputs as a result of the inverter hysteresis. Finally, waveform E is high whenever either of the C or D inputs is low, and it is apparent that there is a pulse in the output waveform for each half cycle of the input.

Although the invention has been described with reference to a particular embodiment, it is to be understood that this embodiment is merely illustrative of the application of the principles of the invention. For example, if no data is to be transmitted in either direction and regulation is not required, terminals X1 and X2 could be held low permanently. Thus it is to be understood that numerous modifications may be made in the illustrative embodiment of the invention and other arrangements may be devised without departing from the spirit and scope of the invention.

What we claim is:

1. A bridge circuit comprising energy storage means; energy receiver means; two pairs of complementary field-effect transistors arranged in a bridge configuration between said energy receiver means and said energy storage means; and means for biasing the gates of all of said field-effect transistors such that when the voltage across said energy receiver means is less than the voltage across said energy storage means each of said transistors conducts a low quiescent current in one direction, and when the voltage across said energy receiver means is greater than the voltage across said energy storage means the transistors in one of said two pairs conduct higher currents in the other direction, the pair which thus conduct higher currents depending upon the relative polarity of the voltage across said energy receiver means.

2. A bridge circuit in accordance with claim 1 which is fabricated on a single CMOS integrated circuit chip.

3. A bridge circuit in accordance with claim 2 wherein each of said transistors has its substrate connected to one side of said energy storage means such that when said transistor conducts in the other direction its threshold voltage is less than the threshold voltage when it conducts in said one direction.

4. A bridge circuit in accordance with claim 3 wherein said biasing means maintains the gate of each of said transistors at a fixed potential relative to the potential at one side of said energy storage means such that the effective gate-source voltage is greater when conduction is in said other direction than it is when conduction is in said one direction.

5. A bridge circuit in accordance with claim 4 further including means for increasing the biases on the gates of a selected pair of said complementary field-effect transistors to control the discharge of said energy storage means through the selected pair into said energy receiver means in a respective direction, and wherein said energy receiver means is adapted upon the discharge of current thereinto for radiating energy.

6. A bridge circuit in accordance with claim 5 wherein said means for increasing the gate biases is operative when the gate biases on all of said transistors are increased for limiting current flow from said energy receiver means into said energy storage means.

7. A bridge circuit in accordance with claim 6 wherein said energy receiver means is a coil.

8. A bridge circuit in accordance with claim 7 wherein said energy storage means is a capacitor.

9. A bridge circuit in accordance with claim 2 wherein said biasing means maintains the gate of each of said transistors at a fixed potential such that the effective gate-source voltage is greater when conduction is in said other direction than it is when conduction is in said one direction.

10. A bridge circuit in accordance with claim 2 further including means for increasing the biases on the gates of a selected pair of said complementary field-effect transistors to control the discharge of said energy storage means through the selected pair into said energy receiver means in a respective direction, and wherein said energy receiver means is adapted upon the discharge of current thereinto for radiating energy.

11. A bridge circuit in accordance with claim 10 wherein said means for increasing the gate biases is operative when the gate biases on all of said transistors are increased for limiting current flow from said energy receiver means into said energy storage means.

12. A bridge circuit in accordance with claim 2 further including means for increasing the gate biases on all of said transistors for limiting current flow from said energy receiver means into said energy storage means.

13. A bridge circuit in accordance with claim 2 wherein said energy receiver means is a coil.

14. A bridge circuit in accordance with claim 2 wherein said energy storage means is a capacitor.

15. A bridge circuit in accordance with claim 1 wherein each of said transistors has its substrate connected to one side of said energy storage means such that when said transistor conducts in the other direction its threshold voltage is less than the threshold voltage when it conducts in said one direction.

16. A bridge circuit in accordance with claim 1 wherein said biasing means maintains the gate of each of said transistors at a fixed potential such that the effective gate-source voltage is greater when conduction is in said other direction than it is when conduction is in said one direction.

17. A bridge circuit in accordance with claim 1 further including means for increasing the biases on the gates of a selected pair of said complementary field-effect transistors to control the discharge of said energy storage means through the selected pair into said energy receiver means in a respective direction, and wherein said energy receiver means in adapted upon the discharge of current thereinto for radiating energy.

18. A bridge circuit in accordance with claim 17 wherein said means for increasing the gate biases is operative when the gate biases on all of said transistors are increased for limiting current flow from said energy receiver means into said energy storage means.

19. A bridge circuit in accordance with claim 1 further including means for increasing the gate biases on all of said transistors for limiting current flow from said energy receiver means into said energy storage means.

20. A bridge circuit in accordance with claim 1 wherein said energy receiver means is a coil.

21. A bridge circuit in accordance with claim 1 wherein said energy storage means is a capacitor.

22. A bridge circuit comprising energy storage means; energy receiver means; two pairs of complementary field-effect transistors arranged in a bridge configuration between said energy receiver means and said energy storage means; means for biasing the gates of all of said field-effect transistors from said energy storage means such that when energy is stored therein all of said transistors remain conducting; and means for applying potentials to the substrates of said transistors such that said transistors deliver rectified current from said energy receiver means to said energy storage means exclusively under control of the potential across said energy receiver means.

23. A bridge circuit in accordance with claim 22 which is fabricated on a single CMOS integrated chip.

24. A bridge circuit in accordance with claim 23 wherein each of said transistors has its substrate connected to one side of said energy storage means such that when said transistor conducts in one direction its threshold voltage is higher than the threshold voltage when it conducts in the other direction.

25. A bridge circuit in accordance with claim 24 wherein said biasing means maintains the gate of each of said transistors at a fixed potential relative to the potential at one side of said energy storage means such that the effective gate-source voltage is greater when conduction is in said other direction than it is when conduction is in said one direction.

26. A bridge circuit in accordance with claim 25 further including means for increasing the biases on the gates of a selected pair of said complementary field-effect transistors to control the discharge of said energy storage means through the selected pair into said energy receiver means in a respective direction, and wherein said energy receiver means is adapted upon the discharge of current thereinto for radiating energy.

27. A bridge circuit in accordance with claim 26 wherein said means for increasing the gate biases is operative when the gate biases on all said transistors are increased for limiting current flow from said energy receiver means into said energy storage means.

28. A bridge circuit in accordance with claim 27 wherein said energy receiver means is a coil.

29. A bridge circuit in accordance with claim 28 wherein said energy storage means is a capacitor.

30. A bridge circuit in accordance with claim 23 wherein said biasing means maintains the gate of each of said transistors at a fixed potential such that the effective gate-source voltage is less when conduction is in one direction than it is when conduction is in the other direction.

31. A bridge circuit in accordance with claim 23 further including means for increasing the biases on the gates of a selected pair of said complementary field-effect transistors to control the discharge of said energy storage means through the selected pair into said energy receiver means in a respective direction, and wherein said energy receiver means is adapted upon the discharge of current thereinto for radiating energy.

32. A bridge circuit in accordance with claim 31 wherein said means for increasing the gate biases is operative when the gate biases on all of said transistors are increased for limiting current flow from said energy receiver means into said energy storage means.

33. A bridge circuit in accordance with claim 23 further including means for increasing the gate biases on all of said transistors for limiting current flow from said energy receiver means into said energy storage means.

34. A bridge circuit in accordance with claim 23 wherein said energy receiver means is a coil.

35. A bridge circuit in accordance with claim 23 wherein said energy storage means is a capacitor.

36. A bridge circuit in accordance with claim 22 wherein each of said transistors has its substrate connected to one side of said energy storage means such that when said transistor conducts in one direction its threshold voltage is higher than the threshold voltage when it conducts in the other direction.

37. A bridge circuit in accordance with claim 22 wherein said biasing means maintains the gate of each of said transistors at a fixed potential such that the effective gate-source voltage is less when conduction is in one direction than it is when conduction is in the other direction.

38. A bridge circuit in accordance with claim 22 further including means for increasing the biases on the gates of a selected pair of said complementary field-effect transistors to control the discharge of said energy storage means through the selected pair into said energy receiver means in a respective direction, and wherein said energy receiver means is adapted upon the discharge of current thereinto for radiating energy.

39. A bridge circuit in accordance with claim 38 wherein said means for increasing the gate biases is operative when the gate biases on all of said transistors are increased for limiting current flow from said energy receiver means into said energy storage means.

40. A bridge circuit in accordance with claim 22 further including means for increasing the gate biases on all of said transistors for limiting current flow from said energy receiver means into said energy storage means.

41. A bridge circuit in accordance with claim 22 wherein said energy receiver means is a coil.

42. A bridge circuit in accordance with claim 22 wherein said energy storage means is a capacitor.

* * * * *